(12) United States Patent
Zhu et al.

(10) Patent No.: US 6,789,119 B1
(45) Date of Patent: Sep. 7, 2004

(54) EMULATING A PERSISTENT CONNECTION USING HTTP

(75) Inventors: Min Zhu, Los Altos Hills, CA (US); Shi Yan, Mountain View, CA (US); Shangde Zhou, Sunnyvale, CA (US)

(73) Assignee: WebEx Communication, Inc., San Jose, CA (US)

(*) Notice: Subject to any disclaimer, the term of this patent is extended or adjusted under 35 U.S.C. 154(b) by 0 days.

(21) Appl. No.: 09/449,011

(22) Filed: Nov. 24, 1999

(51) Int. Cl.[7] .............................................. G06F 15/16
(52) U.S. Cl. ........................ 709/227; 709/203; 709/217; 709/230
(58) Field of Search ................................ 709/227, 228, 709/217, 236, 203, 224, 230

(56) References Cited

U.S. PATENT DOCUMENTS

| | | | |
|---|---|---|---|
| 6,338,089 B1 * | 1/2002 | Quinlan ....................... | 709/227 |
| 6,411,986 B1 * | 6/2002 | Susai et al. .................. | 709/203 |
| 6,412,009 B1 * | 6/2002 | Erickson et al. ............. | 709/228 |
| 6,457,054 B1 * | 9/2002 | Bakshi ........................ | 709/227 |

OTHER PUBLICATIONS

Mogul J., Hypertest Transfer Protocol—HTTP/1.1, Jan. 1997,Network Working Group RFC 2068, pp. 1–161.*
John Heidemann et. al., Modeling the performance of HTTP over serveral transport protocols, Oct. 1997, IEEE/ACM Transactios On Networking, vol. 5, No. 5, pp. 616–630.*
Jeffrey C. Mogul, The Case for Persistent–Connection HTTP, ACM 1995, pp. 299–313.*

* cited by examiner

*Primary Examiner*—David Wiley
*Assistant Examiner*—Phouc Nguyen
(74) *Attorney, Agent, or Firm*—Fish & Richardson P.C.

(57) ABSTRACT

An apparatus, method and computer program product for emulating a persistent connection using http. According to one embodiment, the method includes receiving an empty get from a first client; receiving a get from a second client, the get containing data to be sent to the first client; and sending a response to the first client, in response to the empty get, the response containing the data. According to another embodiment, the method includes receiving, from a client, a get containing first data to be sent to an application server; sending the first data to the application server; sending an ack response to the client in response to the get; receiving a response from the application server, the response containing second data to be sent to the client; waiting for an empty get from the client; receiving an empty get from the client; and sending the second data to the client in response to the empty get. According to another embodiment, the method includes receiving, from a client, a get containing first data to be sent to an application server; sending the first data to the application server; sending an ack response to the client in response to the get; receiving an empty get from the client; receiving a response from the application server, the response containing second data to be sent to the client; and sending the second data to the client in response to the empty get.

13 Claims, 6 Drawing Sheets

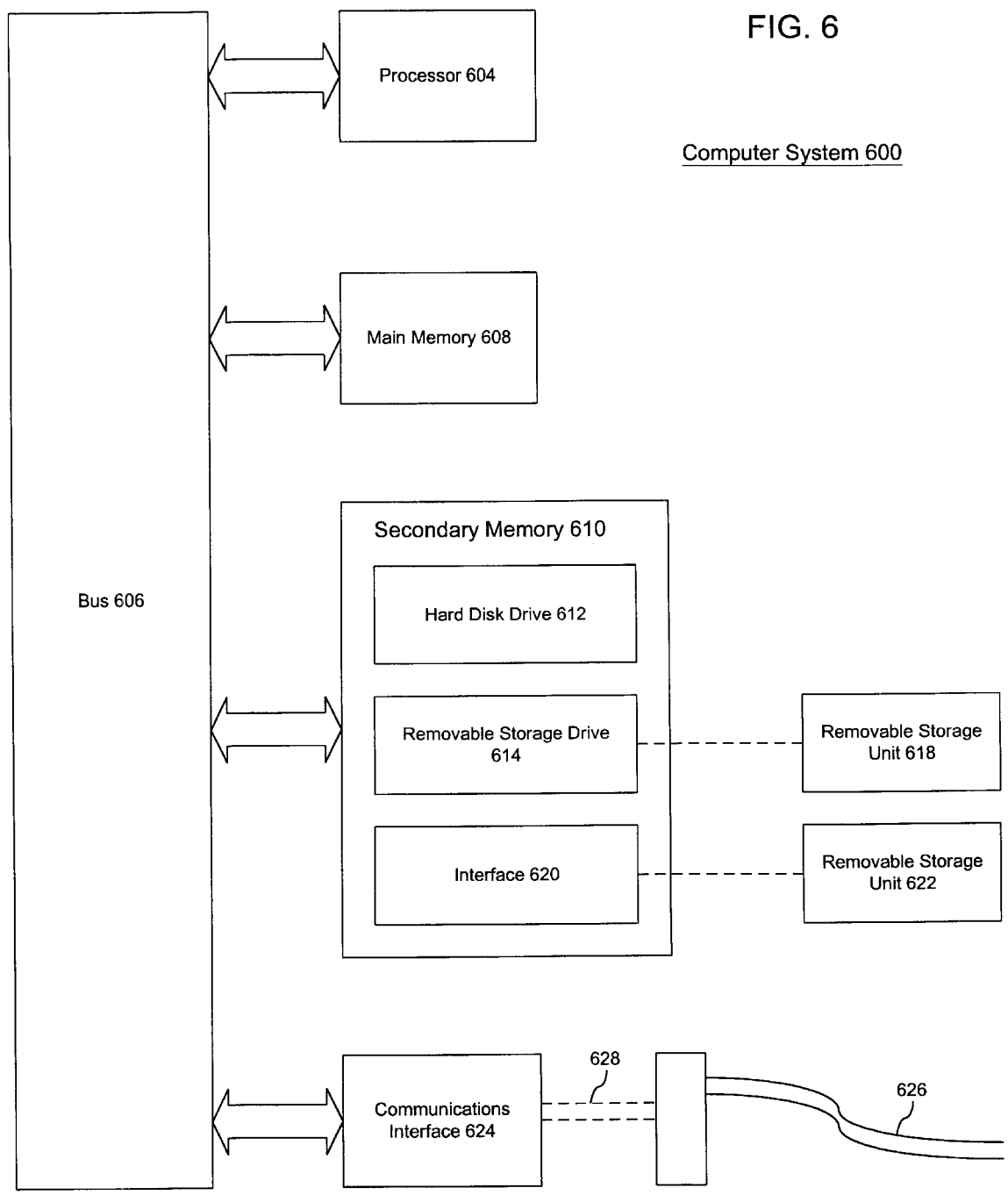

EMULATING A PERSISTENT CONNECTION USING HTTP

BACKGROUND OF THE INVENTION

1. Field of the Invention

Figure 1:
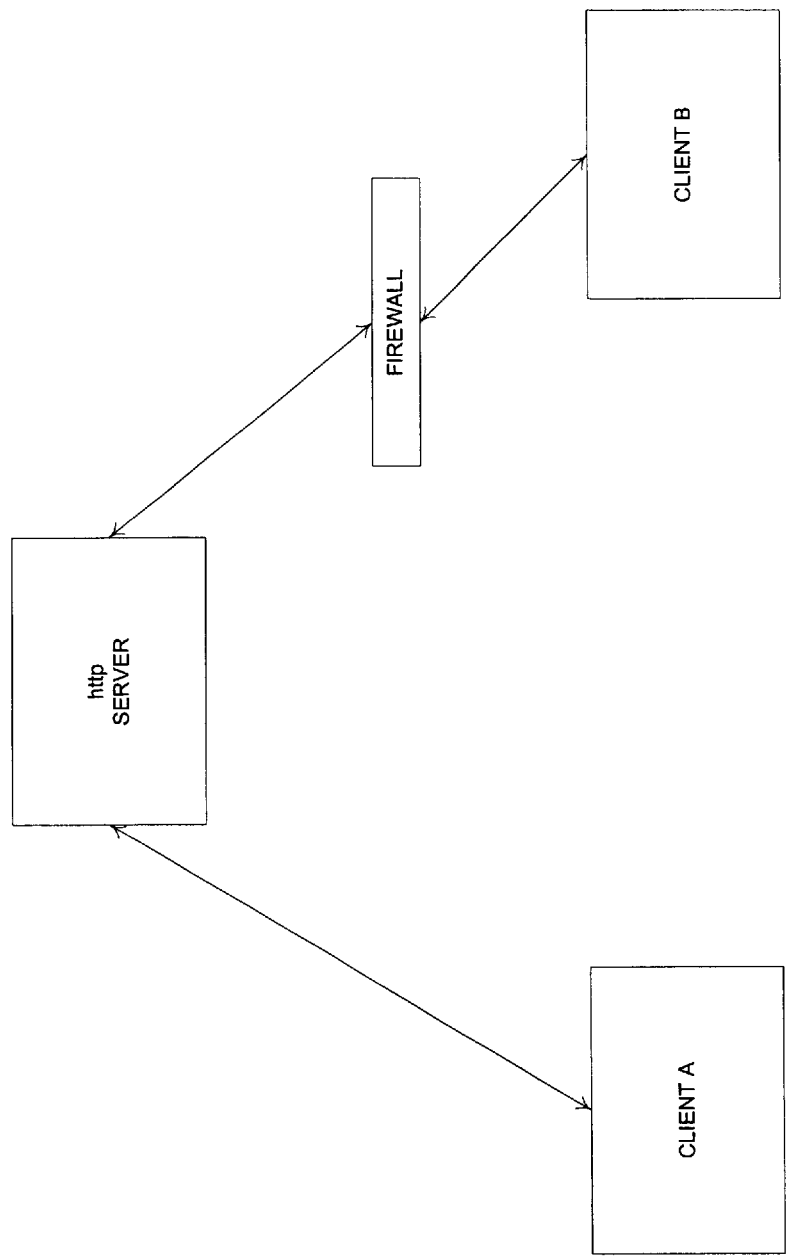

The present invention relates generally to data interchange, and more particularly to methods for establishing a persistent and stable communication connection.

2. Related Art

Whenever two or more people are involved in the preparation of a document, whether it be a financial spread sheet, a CAD design, a circuit schematic layout, an organization report, a bit map image, etc., succeeding drafts of the document are prepared, circulated, and modified in the process. Each person annotates his or her remarks on the document and forwards it to the next person. Typically, several drafts of the document will be circulated before a final draft is produced. This is a very time-consuming process.

In the case where the reviewers involved in this document preparation process are at different geographical locations, getting the document from one location to another location and back becomes another tedious and time-consuming task. The document must be mailed or faxed to that person, further complicating the entire process.

One alternative method to this process is to hold meetings where the reviewers gather and comment on the document with the hope to reduce the number of drafts needed before a final draft is produced. The shortcoming with this method is that there may be significant travel time and travel cost in getting everyone to the same location. In addition, the final draft of the document is usually circulated again for final comments.

One solution to this problem is to use a teleconferencing software program to share the document among the geographically dispersed reviewers. This process is often referred to as "data conferencing." By using computer network connections, modem-connected phone lines, and the like, everyone can be connected via his or her computer. By using the teleconferencing software program, everyone's computer screen displays the same document. In addition to using the software program and network or modem connections, conference calling over the voice phone lines or through the software program creates a dynamic and live atmosphere where everyone can participate in the discussion and refer to the document displayed on the screen.

A key step in enabling data conferencing is making the network connection. The network connection between all the participants needs to be persistent and stable. In addition, many companies protect their internal networks from the Internet by imposing firewalls that bar such persistent stable connections, which are considered to be security risks.

The Hypertext Transfer Protocol (HTTP) is an application-level protocol with the lightness and speed necessary for distributed, collaborative, hypermedia information systems. It is however, a generic, stateless protocol and does not provide all the attributes that are necessary to enable a data conferencing session amongst multiple users or clients, but for this reason, it is permitted to pass most firewalls.

SUMMARY OF THE INVENTION

The present inventions is an apparatus, method and computer program product for emulating a persistent connection using http.

According to one embodiment, the method includes receiving an empty get from a first client; receiving a get from a second client, the get containing data to be sent to the first client; and sending a response to the first client, in response to the empty get, the response containing the data.

According to another embodiment, the method includes receiving, from a client, a get containing first data to be sent to an application server; sending the first data to the application server; sending an ack response to the client in response to the get; receiving a response from the application server, the response containing second data to be sent to the client; waiting for an empty get from the client; receiving an empty get from the client; and sending the second data to the client in response to the empty get.

According to another embodiment, the method includes receiving, from a client, a get containing first data to be sent to an application server; sending the first data to the application server; sending an ack response to the client in response to the get; receiving an empty get from the client; receiving a response from the application server, the response containing second data to be sent to the client; and sending the second data to the client in response to the empty get.

To achieve both of shorter respond time and low network traffic, the current invention implements the following techniques:

1. When a client has data to be sent, it sends an http request to the server. The server analyzes the request, and recognizes that the request is a data packet. The server then handles the data and immediately responds to the request.
2. The client receives the server's response. If it has more data to be sent, then repeat step 1.
3. If the client has no more data, it still sends an http request to the server, but marks this packet as an empty packet. When the server receives this empty packet, it will hold this request instead of responding immediately.
4. When the server is holding a packet and it has data to be sent, it will respond to this packet and send data to the client. In this way, the respond time is decreased to a minimum.
5. The server can not hold a packet indefinitely. If the server does not have any data to be sent for a specific time (e.g. 30 seconds), it will still respond to this packet, and client will send a new http request to server immediately. With this technique, both the server and the client will know that the communication connection is alive.
6. When the server is holding a packet and client has data to be sent, the client will send another http request to the server with the data packet (Before doing this, the client may cancel the old http request to keep only one http connection). When the server finds that it received two http requests from the same client, it will respond to the older http request at once and handle the newer http request. In this way, both the server and the client can send data to each other without any delay, and redundant network traffic is decreased to a minimum.
7. Finally, multiple http requests may still be used simultaneously.

DETAILED DESCRIPTION OF THE PREFERRED EMBODIMENTS

A Brief Description of the HTTP Protocol

The HTTP protocol is based on a request/response paradigm. (See http://ww.ics.uci.edu/pub/ietf/rfc1945.html) A client establishes a connection with a server and sends a request to a server in the form of a request method, followed by a message containing request modifiers, client information, and possible body content. The server responds with a status line, including the message's protocol version and a success or error code, followed by a MIME-like message containing server information, entity metainformation, and possible body content. Current practice requires that the connection be established by the client prior to each request and closed by the server after sending the response.

If a persistent connection is required, as in the case of a collaborative data conferencing session, a client can start the connections contiguously or periodically. That means client sends an http request to server with some data, server respond to client with some data, then client sends another http request to server immediately or after a specific time. In this way, a bi-directional live connection is established.

In the case where higher performance is desired than what is available with a single http request, a client can send multiple http requests to server simultaneously to achieve higher performance.

Limitations for Data Conferencing

Http connection does not provide guarantees regarding order or reliability. For a data conference to occur, both the client and the server must have the ability to handle sequencing, re-send, redundancy, etc to achieve a reliable and ordered live connection.

Whenever a client has data to be sent to the server, the client can initiate an http request to the server. At that time when the server receives the request, if the server has outgoing data, it can send it to the client via the http response. But when the client has no outgoing data, because it can not predict when data will come from the server, it can only send a http request to the server periodically (e.g. 5 seconds). In this period between receiving requests, when the server has data to be sent, the server must wait for the next http request for it to respond. So the shorter the period is set, the shorter the server's respond time will be. But the burden on network and the server will be raised as well.

PREFERRED EMBODIMENTS

FIG. 1 depicts an environment in which the present invention is useful. FIG. 1 depicts two clients interfacing with a server. One of the clients does not have direct access to the server. Rather, that client's access is regulated by a firewall.

Figure 2:
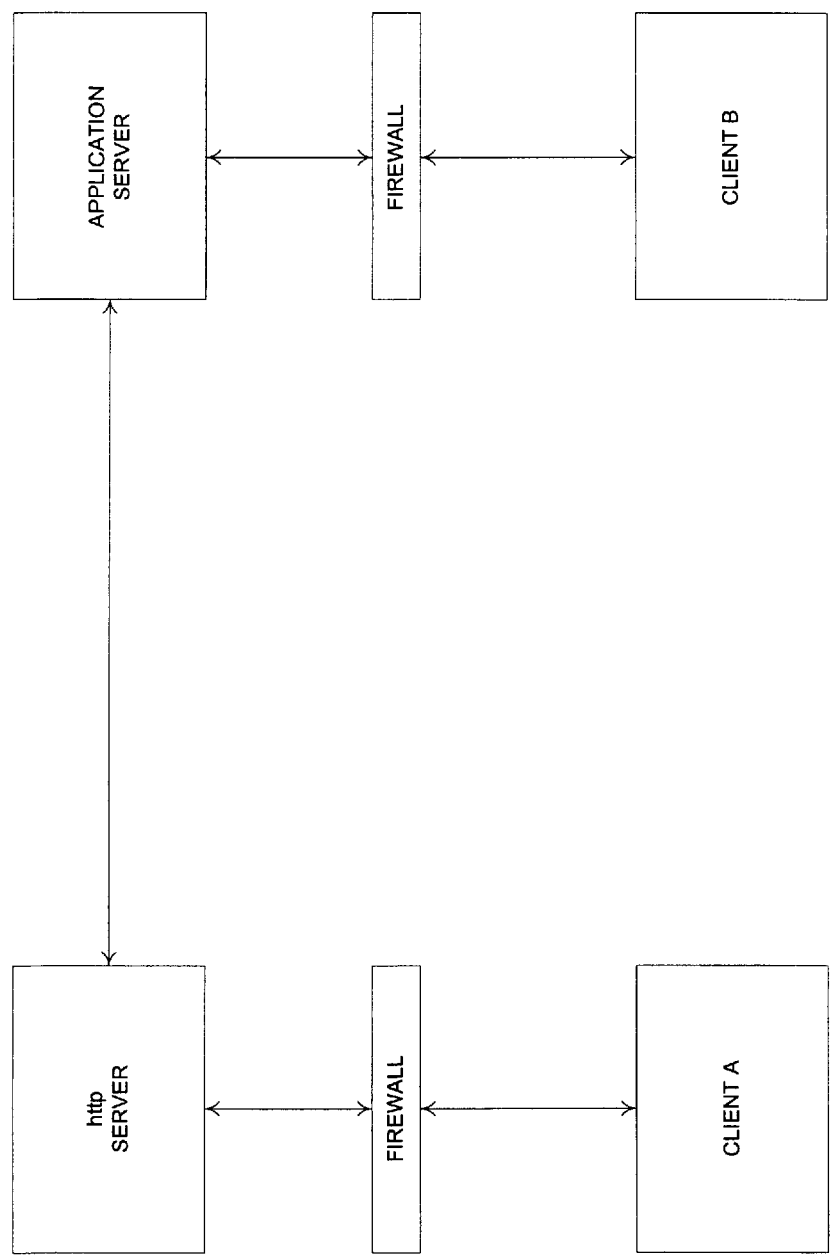

FIG. 2 depicts another environment in which the present invention is useful. Client A communicated with an http server through a firewall and client B communicates with an application's server through another firewall. Usually communications between a client and an application server require a persistent connection in order to provide real time responses to the client from the application server. However, persistent connections are usually not permitted to pass a firewall.

Client A uses the present invention to communicate with the application server through the http server. Client A is isolated from the http server by a firewall. The present invention employs variations of the http protocol to permit or to emulate a persistent connection between client A and the http server. The http server then communicates with the application server according to well known methods.

Figure 3:
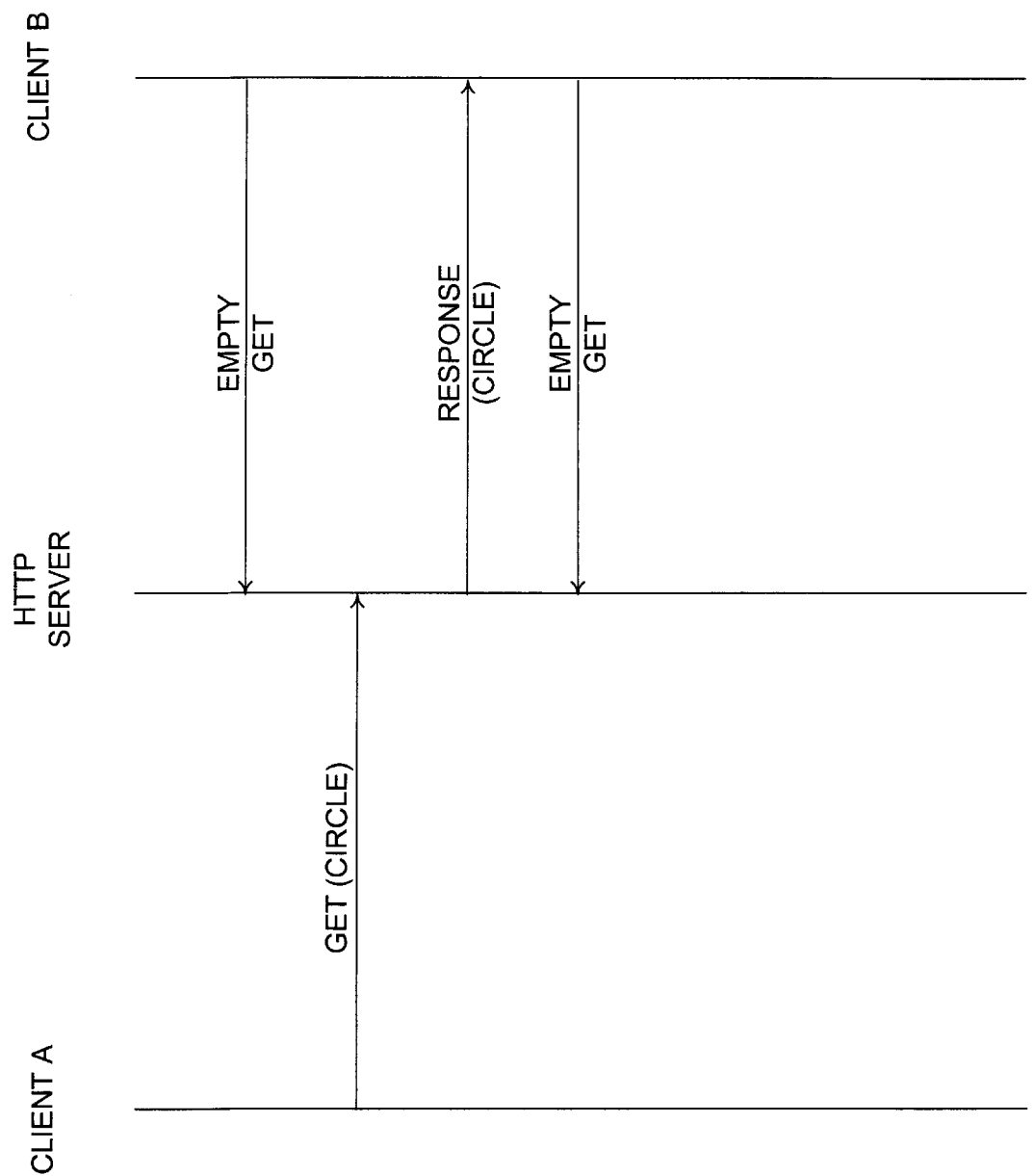

FIG. 3 is a flow diagram depicting an operation of the present invention according to a preferred embodiment.

Referring to FIG. 1 and FIG. 3, client B first sends an empty get message to the http server. The http server holds the empty get for a specific amount of time. During this period, the http server receives a get message from client A. The get message transmits data describing a circle that client A has drawn in a window of his data conferencing application. When the http server receives the circle data in the get message, it transmits a response message containing the circle data to client B. The response message is sent in response to the empty get message previously sent by client B. Client B then sends an empty get message to the http server, to permit the http server to send further data to client B. This is an example of the present invention operating in a data conferencing scenario where the http server is running a data conferencing application that provides windows to clients A and B by which they can view common data and communicate together.

Figure 4:
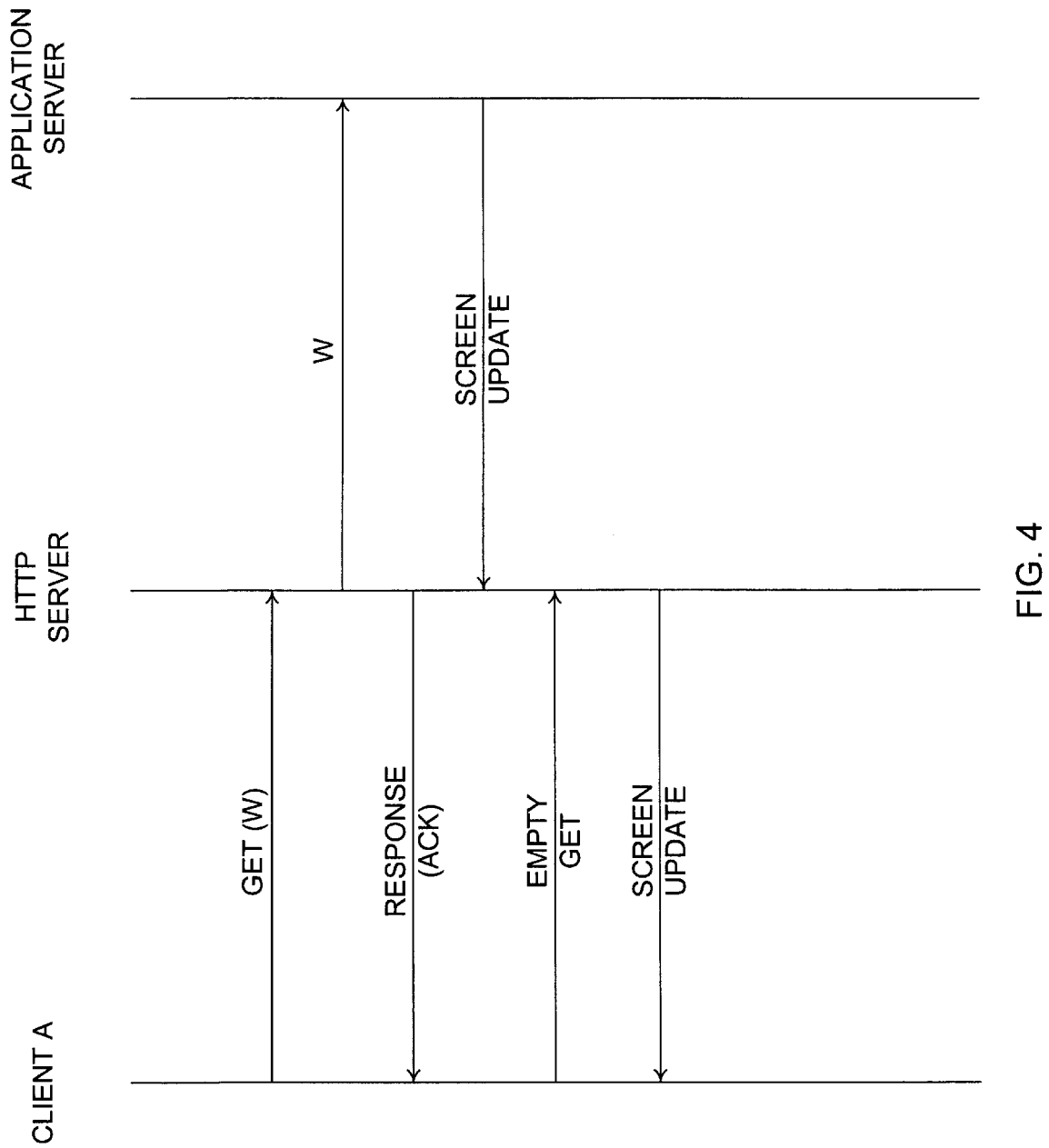
Figure 5:
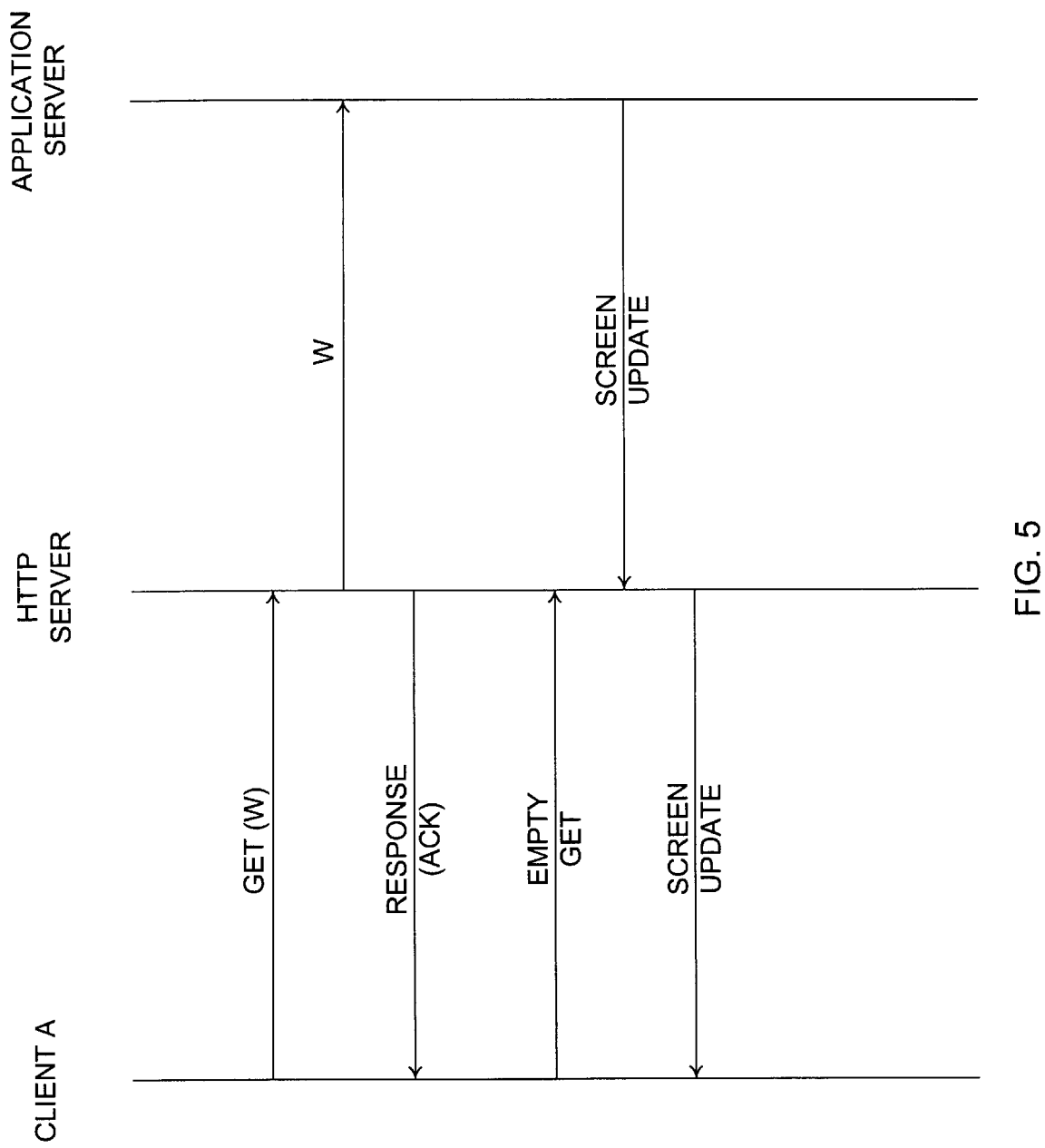

FIGS. 4 and 5 are data flow diagrams describing operations of the present invention according to preferred embodiments. These operations are described with reference to FIG. 2. In these operations, client A is using an application, such as a word processing program, that is hosted by the application server. Referring to FIG. 4, client A types the character "w". In response, client A sends a get message including data describing the character w to the http server. In response, the http server forwards the data describing the w to the application server. The http server waits a pre-defined amount of time before returning a response message to client A. Because no screen update was received from the application server in response to sending the w, the http server sends a response message including an acknowledgement of the get message to client A.

Next, a screen update instructing the screen to paint the character w is received by http server from the application server. However, the http server has no pending get message from client A, and therefore cannot send the screen update to client A. Next however, client A sends an empty get message to the http server to permit the http server to send an screen update to client A. In response to the empty get message, http server sends a screen update to client A.

FIG. 5 depicts a similar scenario, where the empty get message is received from client A before the screen update arrives. In this case, the screen update is immediately forwarded to client A in response to the empty get message. The server also maintains the time order of received http requests and responses, and responds to these messages according to that time order.

The present invention may be implemented using hardware, software or a combination thereof and may be implemented in a computer system or other processing system. In fact, in one embodiment, the invention is directed toward one or more computer systems capable of carrying out the functionality described herein. An example computer system 600 is shown in FIG. 6. The computer system 600 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples of such include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCM-CIA slot and card, etc. Software and data transferred via communications interface 624 are in the form of signals which can be electronic, electromagnetic, optical or other signals capable of being received by communications interface 624. These signals 626 are provided to communications interface 624 via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 618, a hard disk installed in hard disk drive 612, and signals 626. These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus for Hypertext Transfer Protocol (HTTP) data interchange, the apparatus comprising:

a first client configured to establish a connection with an HTTP server and send an empty get that is marked as an empty packet to the HTTP server, the empty get being an HTTP request method;

the HTTP server configured to receive the empty get from the first client, and if the HTTP server has data that is to be sent to the first client, then the HTTP server is configured to respond to the empty get by sending the data to the first client and closing the connection between the first client and the HTTP server, otherwise the HTTP server is configured to hold the empty packet of the empty get until the HTTP server receives data that is to be sent to the first client, and then respond to the empty get by sending the data to the first client and closing the connection between the first client and the HTTP server.

2. The apparatus of claim 1, wherein the HTTP server is configured to hold the empty packet of the empty get for a pre-determined amount of time, and if the HTTP server does not receive data from a second client that is to be sent to the first client within the pre-determined amount of time, then the HTTP server is configured to respond to the empty get by not sending any data to the first client and closing the connection between the first client and the HTTP server.

3. The apparatus of claim 2, wherein if the HTTP server responds to the empty get by not sending any data to the first client and closing the connection between the first client and the HTTP server, then the first client is configured to establish a second connection with the HTTP server and send a second empty get that is marked as an empty packet to the HTTP server.

4. An apparatus for Hypertext Transfer Protocol (HTTP) data interchange, comprising:

a client configured to run an application that is hosted by an application server, the client configured to establish a first connection with an HTTP server and send a get that includes data to the HTTP server, the get being an HTTP request method;

the HTTP server configured to forward the data to the application server and send an acknowledgement response to the client that the HTTP server has received the get and close the first connection between the client and the HTTP server, the HTTP server further configured to receive second data from the application server that is to be sent to the client, wherein the client is further configured to establish a second connection with the HTTP server and send an empty get that is marked as an empty packet to the HTTP server, the empty get being a an HTTP request method, if the HTTP server receives the empty get from the client prior to receiving the second data from the application server, then the HTTP server is configured to immediately forward the second data, upon receipt of the second data, to the client and close the second connection between the client and the HTTP server, in response to the empty get, otherwise if the HTTP server receives the empty get from the client after receiving the second data from the application server, then the HTTP server is configured to hold the second data until the HTTP server receives the empty get from the client, and then forward the second data to the client and close the second connection between the client and the HTTP server, in response to the empty get.

5. A method for Hypertext Transfer Protocol (HTTP) data interchange, comprising:

establishing a connection with a first client and receiving an empty get that is marked as an empty packet from the first client, the empty get being an HTTP request method;

receiving a get from a second client, the get containing data to be sent to the first client, the get being an HTTP request method; and sending a response to the first client and closing the connection with the first client, in response to the empty get, the response containing the data.

6. A method for Hypertext Transfer Protocol (HTTP) data interchange, comprising:

establishing a first connection with a client and receiving, from the client, a get containing first data to be sent to an application server, the get being an HTTP request method;

sending the first data to the application server;

sending an ack response to the client and closing the first connection with the client, in response to the get;

receiving a response from the application server, the response containing second data to be sent to the client;

waiting for an empty get from the client, an empty get being an HTTP request method;

establishing a second connection with the client and receiving an empty get that is marked as an empty packet from the client; and sending the second data to the client and closing the first connection with the client, in response to the empty get.

7. A method for Hypertext Transfer Protocol (HTTP) data interchange, comprising:

establishing a first connection with a client and receiving, from the client, a get containing first data to be sent to an application server, the get being an HTTP request method;

sending the first data to the application server;

sending an ack response to the client and closing the first connection with the client, in response to the get;

establishing a second connection with the client and receiving an empty get that is marked as an empty packet from the client, the empty get being an HTTP request method;

receiving a response from the application server, the response containing second data to be sent to the client; and sending the second data to the client and closing the first connection with the client, in response to the empty get.

8. A computer program product for Hypertext Transfer Protocol (HTTP) data interchange, the computer program product comprising a computer usable medium having computer readable program code means embodied in the medium, the computer readable program code means comprising:

computer readable program code means for causing a computer to establish a connection with a first client and receive an empty get that is marked as an empty packet from a first client, the empty get being an HTTP request method;

computer readable program code means for causing a computer to receive a get from a second client, the get containing data to be sent to the first client, the get being an HTTP request method; and computer readable program code means for causing a computer to send a response to the first client and close the connection with the first client, in response to the empty get, the response containing the data.

9. A computer program product for Hypertext Transfer Protocol (HTTP) data interchange, the computer program product comprising a computer usable medium having computer readable program code means embodied in the medium, the computer readable program code means comprising:

computer readable program code means for causing a computer to establish a first connection with a client and receive, from the client, a get containing first data to be sent to an application server, the get being an HTTP request method;

computer readable program code means for causing a computer to send the first data to the application server;

computer readable program code means for causing a computer to send an ack response to the client and close the first connection with the client, in response to the get;

computer readable program code means for causing a computer to receive a response from the application server, the response containing second data to be sent to the client;

computer readable program code means for causing a computer to wait for an empty get from the client, the empty get being an HTTP request method;

computer readable program code means for causing a computer to establish a second connection with the client and receive an empty get that is marked as an empty packet from the client; and computer readable program code means for causing a computer to send the second data to the client and close the first connection with the client, in response to the empty get.

10. A computer program product for Hypertext Transfer Protocol (HTTP) data interchange, the computer program product comprising a computer usable medium having computer readable program code means embodied in the medium, the computer readable program code means comprising:

computer readable program code means-for causing a computer to establish a first connection with a client and receive, from a the client, a get containing first data to be sent to an application server, the get being an HTTP request method;

computer readable program code means for causing a computer to receive send the first data to the application server;

computer readable program code means for causing a computer to receive send an ack response to the client and close the first connection with the client, in response to the get;

computer readable program code means for causing a computer to establish a second connection with the client and receive an empty get that is marked as an empty packet from the client, the empty get being an HTTP request method;

computer readable program code means for causing a computer to receive a response from the application server, the response containing second data to be sent to the client; and computer readable program code means for causing a computer to send the second data to the client and close the first connection with the client, in response to the empty get.

11. A system for emulating a persistent connection using a Hypertext Transfer Protocol (HTTP) data interchange, the system comprising:

a client configured to open a connection with an HTTP server and send an HTTP get method containing data to the HTTP server when the client has data to send to the HTTP server, or send an empty HTTP get method that is marked as an empty packet to the HTTP server when the client does not have data to send to the HTTP server;

the HTTP server configured to receive, from the client, a get method containing data or an empty HTTP get method that is marked as an empty packet, wherein A) if the HTTP server receives an HTTP get method containing data and the HTTP server has second data to respond to the HTTP get method, then the HTTP server will send the second data to the client and close the-connection between the client and the HTTP server, in response to the HTTP get method, B) if the HTTP server receives an HTTP get method containing data and the HTTP server does not have second data to respond to the HTTP get method, then the HTTP server will send an acknowledgement response to the client and close the connection between the client and the HTTP server, in response to the HTTP get method, C) if the HTTP server receives an empty HTTP get method marked as an empty packet and the HTTP server has second data to respond to the empty HTTP get method, then the HTTP server will send the second data to the client and close the connection between the client and the HTTP server, in response to the empty HTTP get method, D) if the HTTP server receives an empty HTTP get method that is marked as an empty packet and the HTTP server does not have second data to respond to the empty HTTP get method, then the HTTP server will hold the empty packet until the HTTP server receives second data to be sent to the client and then forward the second data to the client and close the second connection between the client and the HTTP server, in response to the empty HTTP get method.

12. The system of claim 11, wherein the HTTP server is configured to hold the empty packet of the empty HTTP get method for a pre-determined amount of time, and if the HTTP server does not receive second data that is to be sent to the client within the pre-determined amount of time, then the HTTP server is configured to respond to the empty HTTP get method by not sending any data to the client and closing the connection between the client and the HTTP server.

13. The system of claim 12, wherein if the HTTP server responds to the empty HTTP get method by not sending any data to the client and closing the connection between the client and the HTTP server, then the client is configured to establish a second connection with the HTTP server and send a second empty HTTP get method marked as an empty packet to the HTTP server.

* * * * *